United States Patent [19]

Bray

[11] 4,221,752
[45] Sep. 9, 1980

[54] PLANT RECEPTACLE AND METHOD OF PRODUCING SAME

[75] Inventor: James W. Bray, Wadsworth, Ohio

[73] Assignee: Shells, Inc., Wadsworth, Ohio

[21] Appl. No.: 773,904

[22] Filed: Mar. 3, 1977

[51] Int. Cl.² .............................. B29C 5/02; B29C 5/06
[52] U.S. Cl. ...................................... 264/121; 264/126
[58] Field of Search .................... 164/37, 43; 264/109, 264/121, 126, 123, 236, 336, 347, 122, 213, 300; 47/66, 80; 260/19 R, DIG. 40; 252/12, 39, 40.5; 106/243

[56] References Cited

U.S. PATENT DOCUMENTS

| 1,339,134 | 5/1920 | Redman | 264/236 |
|---|---|---|---|
| 2,660,568 | 11/1953 | Cunder et al. | 106/243 |
| 2,810,989 | 10/1957 | Terry | 47/66 |
| 2,813,840 | 11/1957 | Salberg | 260/DIG. 40 |
| 2,888,418 | 5/1959 | Albanese et al. | 260/DIG. 40 |
| 2,955,336 | 10/1960 | Horn et al. | 260/DIG. 40 |
| 2,976,589 | 3/1961 | Hackett et al. | 164/43 |
| 3,392,138 | 7/1968 | Dewey | 164/43 |
| 3,429,359 | 2/1969 | Hollingsworth | 164/37 |
| 3,472,307 | 10/1969 | Godding | 164/37 |
| 3,540,521 | 11/1970 | Buck | 164/37 |
| 3,635,877 | 1/1972 | VanWyk | 260/DIG. 40 |
| 3,878,159 | 4/1975 | Vargiu et al. | 164/43 |
| 3,944,514 | 3/1976 | Nishiyama et al. | 260/DIG. 40 |

OTHER PUBLICATIONS

Glasstone, Textbook of Physical Chemistry, Van Nostrand, N. Y. (1946), pp. 486 and 487 relied on.

Primary Examiner—W. E. Hoag
Attorney, Agent, or Firm—Watts, Hoffmann, Fisher & Heinke Co.

[57] ABSTRACT

A sand molded plant receptacle, specifically a flowerpot, made of a non-wetting resin-bonded sand characterized by smooth inside and outside surfaces, a density of about 100 lbs. per cu. ft., a permeability of about 60 to 160, and by being impervious to water and pervious to air. A method of making a sand molded flowerpot which comprises blowing resin-coated sand under pressure into a closed, heated mold.

5 Claims, 3 Drawing Figures

PLANT RECEPTACLE AND METHOD OF PRODUCING SAME

BACKGROUND OF THE INVENTION

1. Field of the Invention

The invention relates to plant husbandry and more particularly to plant receptacles.

2. Description of the Prior Art

Sand molded flowerpots have been proposed in the past. Such flowerpots are typically pervious to both air and water, are light weight, have rough interior or exterior surfaces, and are relatively expensive to manufacture due to long molding cycles.

One prior art proposal is disclosed in U.S. Pat. No. 2,810,989. According to the process disclosed in that patent, the shell molding material is either a dry, mechanical mixture of sand and 4 to 15% by weight resin or a sand coated with 2 to 6% resin dissolved in a solvent. An excess of the material is blown or dumped into or on a heated metal pattern and allowed to partially cure, whereupon the pattern is inverted to release excess, uncured material. The sand employed in the process is of medium fineness, i.e. about 75 on the AFS scale, and the molding and curing time is described as ranging from 5 to 15 minutes. The flowerpot produced by the described method has a density of about 60 lbs. per cu. ft. compared to a density of about 100 lbs. per cu. ft. for conventional clay pots.

The resulting flowerpot is pervious to water unless special additives are included in the mix. This characteristic is believed to be due to the fact that the sand has a polarity attraction to water and is therefor easily wetted. The process of using either a mechanical resin-sand mixture or a solvent coating technique is such that the resin melts or coats the sand particles only where they touch each other, while the remaining surface portions are primarily uncoated and exposed. When water is introduced into the prior art pot, it fills the interstices of the wall by capillary action with the result that the pot leaks. Eventually the interstices of the bonded sand structure become filled with salts so that the pot loses its desired breathability or permeability to air.

In order to make the pots of U.S. Pat. No. 2,810,989 impervious to water, it is disclosed that it is necessary to mix fine materials, such as silica flour or zirconite flour, with the medium sand, thereby adding to the cost of manufacture. The use of such additives has the undesirable effect of adversely effecting the permeability of the pot to air.

The flowerpot of U.S. Pat. No. 2,810,989 is further characterized in that the surface which contacts the pattern is smooth, while the opposite surface is rough. The rough surface is undesirable because the pots can be damaged when they are nested for shipment and storage. A rough inner surface has the further disadvantage of making it difficult to transplant.

SUMMARY OF THE INVENTION

The present invention provides a novel and improved sand molded plant receptacle, more particularly a flowerpot, and a novel and improved method of producing the same which overcomes the foregoing disadvantages of the prior art. The receptacle or flowerpot of the invention has smooth inner and outer surfaces, is pervious to air but impervious to water without any additives, and is of a density comparable to that of conventional clay flowerpots and much the same feel to one handling the flowerpot. The improved physical characteristics of the new flowerpot are achieved by a sand molding operation which can be carried out faster than known shell molding techniques heretofore employed for making flowerpots and using less expensive materials.

More specifically, the invention provides a method of making a sand molded flowerpot characterized by smooth inside and outside surfaces, a density substantially that of a conventional clay flowerpot, e.g. about 100 lbs. per cu. ft., and a permeability of about 60 to 160 comprising the steps of providing a resin-coated sand mix prepared by hot coating, blowing the mix under pressure into a closed, heated mold having complementary male and female surfaces spaced apart a predetermined distance to define the inner and outer surfaces of the molded flowerpot, allowing the mix to at least partially set while in contact with the mold surfaces, and then removing the molded flowerpot from the mold.

In a preferred embodiment of the invention, the resin-coated sand mix is blown into the mold at a pressure in the range from about 20 to 80 lbs. per square inch, and the closed mold is heated to a temperature in the range of about 300° to 550° F. The preferred resin-coated sand mix comprises silica sand or the equivalent having a fineness which may range from about 55 to about 120 AFS, a phenolic resin such as novalac or the like in an amount of about 2% to 6% by weight of the sand, a lubricant in the amount of about 5% by weight of the novalac, and hexamethylenetetramine in an amount of about 8% to 20% by weight of the novalac.

The use of a phenolic resin-sand mix prepared by hot coating, which mix is blown under pressure into a closed, heated mold, makes it possible to obtain a molded flowerpot which is pervious to air but impervious to water. The phenolic resin is basically a water resistant material. The hot coating technique results in the sand particles being substantially uniformly coated with the phenolic resin so that the molded pot resists wetting and consequent leakage and the interstices remain open to permit breathability. Because of its imperviousness, water can be contained in the flowerpot of the invention without leaking through its molded wall. At the same time, the breathability of the flowerpot permits the plant to obtain moisture from the air, as long as it is in the gaseous state. High humidity in the air will provide moisture to the plant through the pot wall. The breathability of flowerpots according to the invention is superior to that of clay pots. Prior art flowerpots made of plastic and ceramics have no breathability at all.

The water imperviousness characteristic of the new flowerpot can be achieved using relatively inexpensive, coarse sands, e.g. about 55 AFS. Prior art sand molding techniques used for flowerpots wherein the sand mix was blown onto or into an open pattern required the use of finer and more expensive sands, e.g. sands of about 75 AFS or finer. The invention also makes it possible to avoid the use of additives such as refractory flour in order to achieve imperviousness to water.

The density of a sand molded flowerpot is an important physical characteristic because strength is directly proportional to density. Further, high density, sand molded flowerpots exhibit better imperviousness to water. The new flowerpot of the invention has a density of about 100 lbs. per cu. ft. compared to a conventional sand molded flowerpot density of about 60 lbs. per cu. ft. The density of the new flowerpot is approximately the same as that of a conventional clay flowerpot which is an added advantage because of the desirability of providing a product which will have much the same "feel" as a clay flowerpot. The tensile strength of the sand molded material is in the range of from 350-700 psi compared to a range of from about 250-350 for clay.

The smooth inner and outer surfaces of the new flowerpot are achieved by blowing the sand mix into a closed mold in contact with complementary male and female surfaces that define the inner and outer surfaces of the flowerpot. The smooth inner and outer surfaces permit the flowerpots to be nested for shipment and storage without damage. Further, the smooth inner surfaces of the flowerpots facilitate transplanting. The smooth surfaces characterizing the flowerpot of the invention make it attractive commercially.

The cycle time of the molding operation employed in accordance with the present invention is about 30 to 60 seconds compared to cycle times of from 5 to 15 minutes with prior art shell molding techniques. The considerably shorter molding time, together with the use of less expensive materials as discussed above, make it possible to achieve an improved flowerpot at a reduced cost.

Other advantages and a fuller understanding of the invention will be had from the following detailed description when taken in conjunction with the accompanying drawings.

SHORT DESCRIPTION OF THE DRAWINGS

DESCRIPTION OF THE PREFERRED EMBODIMENT

Figure 1:
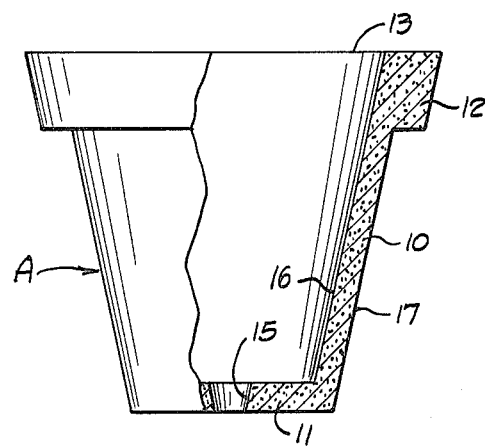
FIG. 1 is an elevational view, with parts broken away, of a flowerpot embodying the present invention.

The plant receptacle or flowerpot of the invention is generally designated by reference character A in FIG. 1. The flowerpot A has a typical frusto-conical shape and includes a side wall 10, a bottom wall 11, and a flange 12 around the upper open end 13. The bottom wall 11 is provided with a central opening 15 in the manner of conventional clay flowerpots. In accordance with the present invention, the inner and outer surfaces 16, 17, respectively, of the side wall 10 are smooth. It is to be understood that the illustrated shape of the flowerpot A is merely illustrative of a typical finished product produced in accordance with the invention and that the size and shape of the flowerpot can be varied as desired.

The flowerpot A is molded from a resin-coated sand mix. Various resin-coated sands are commercially available for use in a resin-shell molding process. The typically used sands are silica. Phenol-formaldehyde resins, for example, novalac and the like, have been found to be satisfactory and are preferred.

As is well known, there are a number of different methods used to produce resin-coated sands, and such methods fall into the classifications of cold, warm and hot coating processes. The method of the invention is carried out using resin-coated sand prepared by hot-coating, since it has been discovered that the use of hot-coated sand makes it possible to achieve finished products exhibiting the desired high density, strength and imperviousness to water.

The fineness of the sand may vary from about 55 to about 120 AFS. Because of economic considerations, it is preferred to use a relatively coarse sand having fineness of about 55 AFS. With the process of the invention, it is possible to use a relatively coarse sand and still achieve a finished product that is impervious to water. At the same time, the process of the invention avoids the necessity of using additives in order to achieve water imperviousness.

Figure 2:
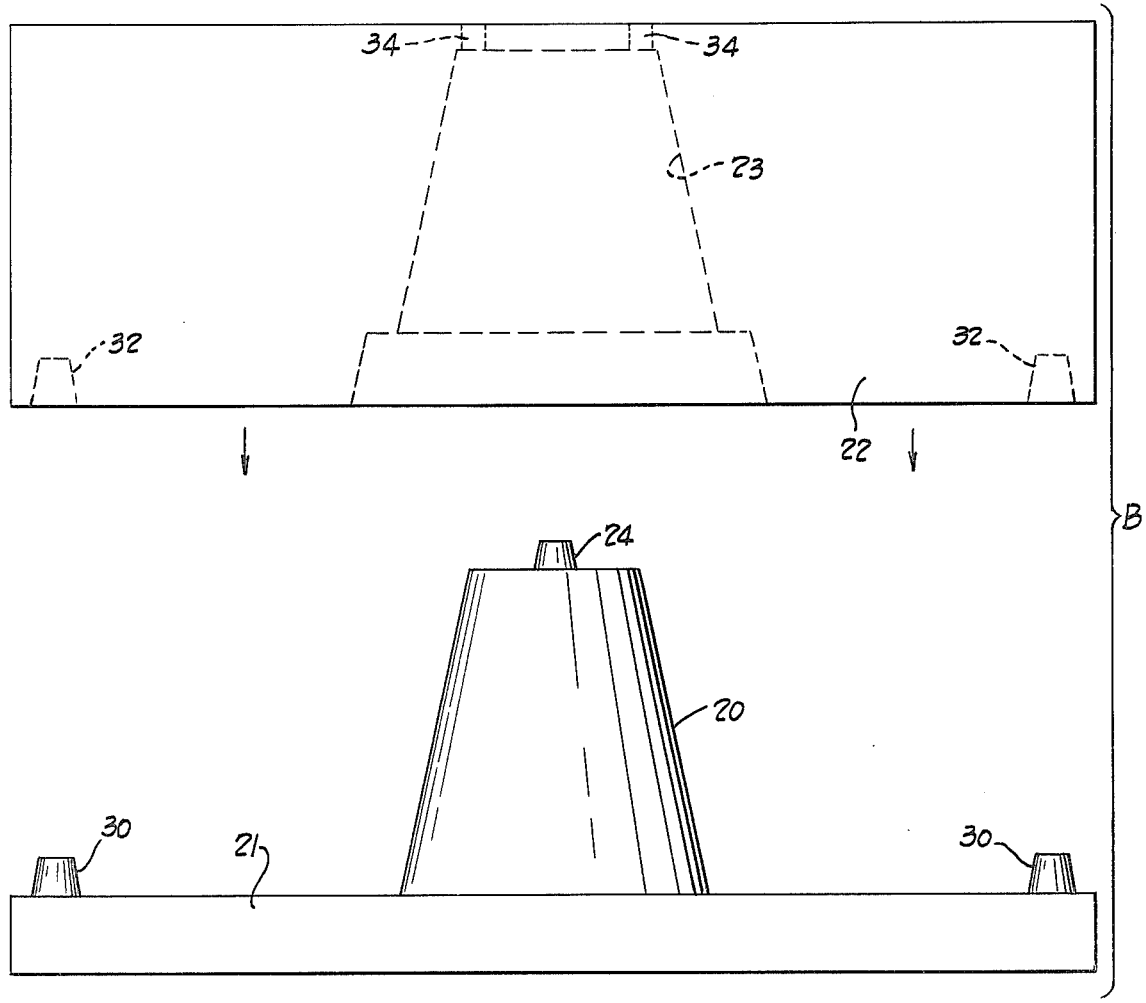
FIG. 2 is an elevational view of a mold, with the drag and cope separated, similar to that employed in making the flowerpot shown in FIG. 1.
Figure 3:
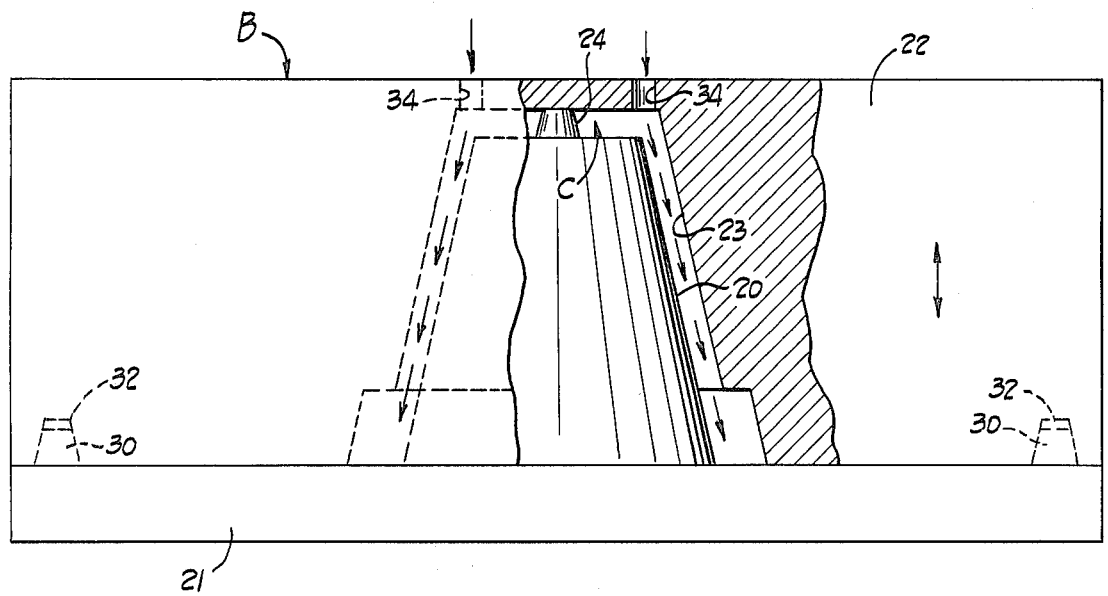
FIG. 3 is an elevational view with the drag and cope closed of the mold shown in FIG. 2, with parts broken away.

The flowerpots of this invention as previously stated are produced by blowing under pressure a resin-coated sand mix of the character referred to into a cavity of a closed, heated mold, such as the closed cavity C in the two-part mold B schematically illustrated in FIGS. 2 and 3. The mold B may be one of a gang of molds capable of molding anywhere from two to sixty pots at a time on a horizontal blow machine (not shown).

The mold B comprises a lower male member or mandrel 20 mounted on a plate 21 and a female member 22 which includes a cavity 23 complementary to the mandrel 20. The configuration and size of the mandrel 20 is that of the inside of the flowerpot to be produced. In the present instance, the mandrel 20 is in the form of an inverted fustrum of a cone with its base adjacent to the plate 21. A small frusto-conical plug 24 is located on top of the mandrel 20 in order to form the hole 15 of the flowerpot A.

The cavity 23 of the female mold member 22 conforms to the outer surface of a flowerpot to be produced. When the mold members 20, 22 are fitted together as illustrated in FIG. 3, the mandrel 20 and the surface of the cavity 23 are spaced apart a predetermined distance to define the inner and outer surfaces, respectively, of the molded flowerpot. Cooperating guide pins 30 and apertures 32 in the parts 21, 22 of the mold assure proper alignment of the mandrel 20 in the cavity 23. Holes 34 opening into the bottom of the cavity 23 are provided in the female mold member 22 to permit the resin-coated sand mix to be blown into the cavity.

In operation the mold is closed and heated to about 300° to 550° F., more preferably 450° F. The mold can be heated in any conventional manner. The resin-coated sand mix, previously charged into a hopper that feeds the blow machine reservoir, is blown under pressure into the cavity C of the closed mold formed by the cooperating members 20, 22. The sand is blown under pressure of from about 5 to 80 psi. The mold being heated to about 300° to 550° F. polymerizes the resin so that the mix sets to a hard and rigid condition. The total molding and curing time ranges from about 30 to 60 seconds depending upon the size and wall thickness of the flowerpot being produced and the degree of cure required.

The thickness of the sidewall 10 of the flowerpot A may vary from about ⅛ of an inch to about 1 inch. As previously described, the finished product has a relatively high density of about 100 lbs. per cu. foot, exhibits good strength, and has smooth interior and exterior surfaces which facilitate nesting of one pot within another and make the pots commercially attractive. Tensile strength tests conducted using sand molded specimens produced according to the invention range from about 350 to 700 psi compared to strengths of from about 250 to 350 psi for conventional clay material.

The flowerpot of the invention is further characterized by a permeability in the range of from about 60 to 160 on the AFS Permeability Index. The AFS Permeability Number was determined by measuring the rate of air flow (cubic centimeters per minute) passing under a pressure of one gram per square centimeter through a specimen one square centimeter in cross-section.

An illustrative example of the invention comprises the steps of preparing a resin-coated sand mix according to the following formula:

2000 lbs. silica sand (approximately 55 AFS)
60 lbs. novalac
9 lbs. hexamethylenetetramine
2 lbs. wax (calcium stearate)
10 qts. water The sand mix is prepared by a conventional hot-coating process in which the sand is heated to about 300° F. and charged into a commercially available sand coating unit. The novalac containing the wax lubricant is added to the hot sand in the coating unit and allowed to melt and coat the sand particles. The wax lubricant (calcium stearate) enhances the free-flowing characteristic of the resin-sand mixture. The hexa dissolved in water is then added to the mixer to quench the heated, coated sand and is mulled into the mix. After the moisture is driven off the sand mix is cooled to about 180° F. and the mix is screened to the original fineness and thereafter further cooled to ambient temperature.

A metal mold substantially as shown in FIGS. 2 and 3 capable of producing a pot having a height of 6 inches, a wall thickness of ¼ of an inch, a base diameter of 4 inches and a mouth diameter of 6½ inches is heated to about 450° F. and the sand mix is blown into the closed cavity under a pressure of about 40 lbs. per square inch. The molding and curing time required to form the finished product is about 40 seconds. The molded pot is characterized by a density of about 100 lbs. per cu. ft. and a permeability of about 90.

Many variations and modifications of the invention will be apparent to those skilled in the art in light of the foregoing detailed disclosure. Therefore, it is to be understood that, within the scope of the appended claims, the invention can be practiced otherwise than as specifically described.

What I claim is:

1. A method for making a sand molded flower pot characterized by smooth inside and outside surfaces, and a permeability of about 60 to 160 comprising the steps of providing a resin-coated sand mix prepared by hot coating, said sand mix comprising a sand having a fineness from about 55 to about 120 AFS and thermosetting resin in an amount of from 2% to 6% by weight of the sand, blowing said mix under pressure into a closed, heated mold having complementary male and female surfaces spaced apart a predetermined distance to define the inner and outer surfaces of the molded flowerpot, blowing said mix into the mold under a pressure sufficient to produce a molded density of about 100 lbs. per cu. ft., allowing said mix to at least partially set while in contact with said mold surfaces, and removing the molded flowerpot from the mold.

2. A method as claimed in claim 1 wherein said mix is blown into said mold at a pressure in the range of from about 5 to 80 lbs. per square inch.

3. A method as claimed in claim 1 wherein said mold is heated to a temperature in the range of about 300° to 550° F.

4. A method as claimed in claim 1 wherein said mix is prepared using a phenolic resin.

5. A method of making a sand molded flowerpot characterized by smooth inside and outside surfaces, a density of 100 lbs. per cu. ft., having a permeability of about 60 to 160, comprising the steps of providing a resin-coated sand mix prepared by hot coating, said sand mix comprising sand having a fineness of about 55–120 AFS, from about 2% to 6% novolac by weight of the sand, about 5% lubricant by weight of the novolac and about 10% to 20% hexamethylenetetramine by weight of the novolac, blowing said sand mix under pressure of from about 5 to 80 lbs. per square inch into a closed mold heated to about 300° to 500° F., said mold having complementary male and female surfaces spaced apart a predetermined distance to define the inner and outer surfaces of the molded flowerpot, allowing said resin-coated sand mix to partially set while in contact with said mold surfaces, thereafter remaining the molded flowerpot from said mold.

* * * * *